(12) United States Patent
Li et al.

(10) Patent No.: US 6,580,795 B1
(45) Date of Patent: Jun. 17, 2003

(54) ECHO CANCELLER FOR A FULL-DUPLEX COMMUNICATION SYSTEM AND METHOD THEREFOR

(75) Inventors: Zhao Li, Austin, TX (US); John E. Lane, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/418,301

(22) Filed: Oct. 14, 1999

(51) Int. Cl.[7] .............................................. H04M 9/08
(52) U.S. Cl. ........................ 379/406.14; 379/406.09; 379/406.08; 379/406.06; 379/406.01; 379/406.12; 379/406.13; 379/406.02
(58) Field of Search ..................... 379/406.01–406.16

(56) References Cited

U.S. PATENT DOCUMENTS

| | | | |
|---|---|---|---|
| 4,600,815 A | 7/1986 | Horna | 179/170.2 |
| 5,050,160 A | 9/1991 | Fuda | 370/32.1 |
| 5,410,595 A | 4/1995 | Park et al. | 379/410 |
| 5,502,717 A | 3/1996 | Park | 370/32.1 |
| 5,590,241 A | 12/1996 | Park et al. | 395/2.36 |
| 5,612,996 A * | 3/1997 | Li | |
| 5,687,229 A | 11/1997 | Sih | 379/410 |
| 5,859,914 A * | 1/1999 | Ono et al. | |
| 5,889,857 A * | 3/1999 | Boudy et al. | |

* cited by examiner

Primary Examiner—Forester W. Isen
Assistant Examiner—Ramnandan Singh
(74) Attorney, Agent, or Firm—Joanna G. Chiu (57) ABSTRACT

An echo canceller (110) for a full-duplex communication system (100) such as a speakerphone determines a gain factor to be used in sub-band adapter coefficient updates by using both time domain and sub-band signals to determine the state of the system (100). In one embodiment a gain factor controller (120) uses the sampled time domain signal to determine if the system (100) is in the silence state, and if not uses the sub-band signals to determine whether the system (100) is in the talk, double-talk, or listen state. The gain factor controller (120) selectively changes the gain factor and selectively performs coefficient updating based on the state. In another embodiment the gain factor controller (120) determines the state and selectively updates coefficients using state information developed on a band-by-band basis.

25 Claims, 6 Drawing Sheets

ECHO CANCELLER FOR A FULL-DUPLEX COMMUNICATION SYSTEM AND METHOD THEREFOR

CROSS REFERENCE TO RELATED, COPENDING APPLICATIONS

Related subject matter is found in the following copending patent applications:

1. Application Ser. No. 09/129,076, entitled "Method and Device for Detecting Near-End Voice," invented by Tom Hong Li and Michael McLaughlin, filed Aug. 4, 1998 and assigned to the assignee hereof.

2. Application Ser. No. 09/282,914, entitled "Method and Apparatus for Controlling a Full-Duplex Communication System," invented by John Eugene Lane, Patrick K. Kelly, Robert V. Holland, and Garth D. Hillman, filed Mar. 31, 1999 and assigned to the assignee hereof.

FIELD OF THE INVENTION

This invention relates in general to signal processing systems, and more particularly to echo cancellers for full-duplex communication systems.

BACKGROUND OF THE INVENTION

Recent advances in signal processing technology have allowed the development of new products. One product is the full-duplex speakerphone. Prior technology only allowed half-duplex operation because the proximity between the loudspeaker and the microphone caused positive feedback and echo. Half-duplex speakerphones are annoying to users because the speakerphone output is muted while the speaker is talking. The party at the other end is unable to interrupt the conversation until the speaker is quiet for a given length of time.

However, signal processing technology is able to measure room acoustics and automatically cancel echo thereby generated. The signal processor typically uses an adaptive finite impulse response (AFIR) filter whose coefficients are weighted in accordance with the room acoustics. Each AFIR filter coefficient is multiplied by an audio input signal sample which is delayed by a predetermined number of samples from the current input signal sample. For example, if the room causes an echo 50 milliseconds (ms.) after an input signal, samples with time delay up to 50 milliseconds (ms.) are required for the filter and the AFIR filter coefficients are adapted iteratively to cancel this echo. Thus, the signal processor is able to cancel the echo.

Echo cancellers have become more sophisticated over time. For example a simple echo canceller may be replaced by a set of so-called sub-band echo cancellers. Sub-band echo cancellers separate the input signal into smaller frequency bands and perform echo cancellation separately on each of the bands. Associated with each frequency band is a separate FIR filter. While a sub-band echo canceller provides much better cancellation, it also requires more processing.

Echo cancellers are typically implemented using general-purpose digital signal processors (DSPs). The DSPs are also used for other signal processing functions. For example in a video telephone, the DSP may also perform audio and video compression and decompression. The DSP's processing bandwidth available for the other signal processing functions is reduced by the amount that is required by the echo canceller. What is needed is an echo canceller that has the high quality associated with a sub-band echo canceller but consumes less processing bandwidth. Such an echo canceller and an associated method are provided by the present invention, whose features and advantages will be more clearly understood from the following detailed description taken in conjunction with the accompanying drawings.

DETAILED DESCRIPTION OF A PREFERRED EMBODIMENT

Figure 1:
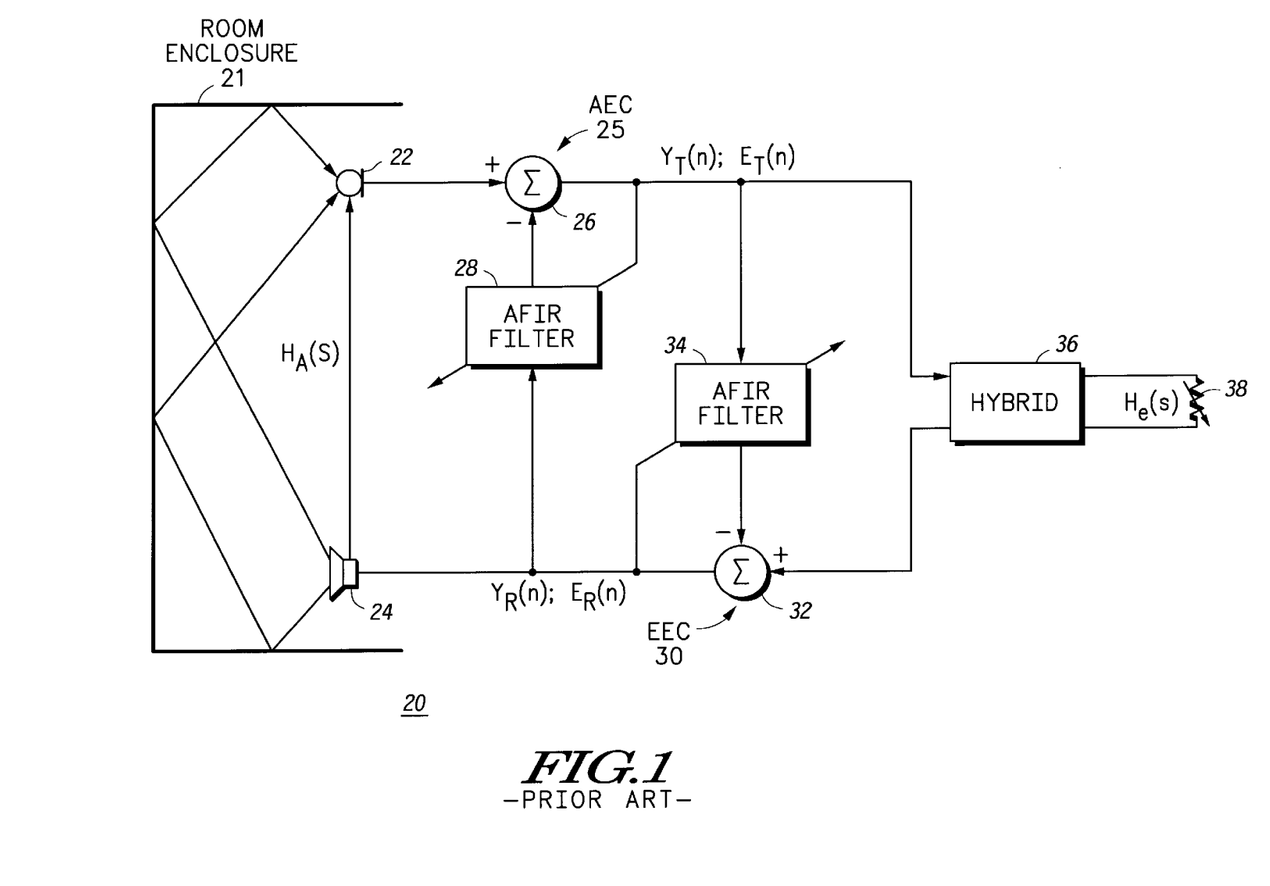
FIG. 1 illustrates in block diagram form a full-duplex speakerphone system known in the prior art.

FIG. 1 illustrates in block diagram form a full-duplex speakerphone system 20 known in the prior art. Speakerphone system 20 includes a microphone 22, a loudspeaker 24, an acoustic echo canceller (AEC) 25, an electrical echo canceller (EEC) 30, a hybrid 36, and an impedance element 38. Microphone 22 is an electromechanical transducer that provides an electrical signal at the output thereof in response to a received acoustic signal. AEC 25 filters this acoustic signal to substantially cancel the echo of the speaker's voice due to the acoustic coupling between loudspeaker 24 and microphone 22. Thus AEC 25 allows the system to operate full-duplex.

AEC 25 includes a summing device 26 and an adaptive finite impulse response (AFIR) filter 28. Summing device 26 has a positive input terminal connected to the output of microphone 22, a negative input terminal, and an output terminal for providing a transmit signal designated "$y_T(n)$". AFIR filter 28 has a reference input terminal, an error input terminal for receiving signal $y_T(n)$, and an output terminal connected to the negative input terminal of summing device 26. Signal $y_T(n)$ has an energy signal associated therewith labeled "$E_T$". Energy signal $E_T$ is equal to the expected value of the square of the transmit signal, and in a typical digital signal processing (DSP) system, is estimated by the following formula:

$$E_T(n) = \beta \cdot E_T(n-1) + (1-\beta) \cdot y_T(n)^2 \qquad [1]$$

Transmit signal $y_T(n)$ is provided to an input of hybrid 36. Hybrid 36 is a conventional 4-wire to 2-wire telephone line hybrid which is connected via a transmission line to a central office (CO). This transmission line and the termination at the CO can be modeled by a variable impedance 38 having a transfer function labeled "$H_e(s)$" connected between the two terminals on the transmission line side of hybrid 36. An output of hybrid 36 provides a received signal that includes both the signal from the far end and any electrical echoes of the transmitted signal that may be caused by the imperfections in hybrid 36 or the transmission line.

Speakerphone system 20 includes EEC 30 to cancel such echoes. EEC 30 includes a summing device 32 and an AFIR filter 34. Summing device 32 has a positive input terminal connected to the output terminal of hybrid 36, a negative input terminal, and an output terminal for providing a received signal labeled "$y_R(n)$", which has an energy associated therewith labeled "$E_R$". AFIR filter 34 has a reference input terminal connected to the output terminal of summing device 26, an error input terminal for receiving signal $y_R(n)$, and an output terminal connected to the negative input terminal of summing device 32. The output terminal of summing device 32 is connected to the reference input of AFIR filter 28 and to an electrical signal input of loudspeaker 24. Loudspeaker 24 is an electromechanical device that provides an acoustic output that is a representation of the electrical input signal.

The acoustic echo that is present in speakerphone system 20 is represented by various reflection paths of the room enclosure as well as by a direct attack path therebetween. The room characteristics causing the acoustic echo can be modeled as a transfer function labeled "$H_A(S)$" between the acoustic signal provided by loudspeaker 24 and the input of microphone 22. AEC 25 adaptively attempts to suppress this acoustic echo, represented by transfer function $H_A(S)$, using coefficients obtained by conventional least-mean-squares (LMS) techniques. Likewise, EEC 30 attempts to cancel the electrical echo through the transmission line by coefficients generated using conventional LMS filtering. Note that typically transfer function $H_e(s)$ is relatively stable during the current call between any given customer premises and the CO to which that telephone line is connected. However, the acoustic echo will vary with different room acoustics, with different positions of the speaker, with the position of different objects in the room, etc. Thus in general the acoustic echo canceller must adapt more frequently.

There are several implementation difficulties associated with speakerphone system 20. First there is a tradeoff between the length and quality of the training interval used to initialize the AFIR filter coefficients, and the discomfort to the user with the training signal. For example, one known training signal is composed of white noise that is typically applied for a period of time on the order of seconds. Another technique applies a chirp signal over a similar period of time. These training signals are annoying to the speaker. If speakerphone system 20 did not generate a training signal and instead allowed the coefficients to adapt naturally during the initial speaking interval, the coefficients may not converge for quite some time, causing speakerphone system 20 to distort the transmitted or received speech during this interval.

There is also a tradeoff that must be made in accommodating different room acoustics. For example, if the initial coefficients are determined for a large room, they will not be optimal when speakerphone system 20 is used in a small room and vice versa. Also, various signal processing functions are performed selectively depending upon whether the person is predominately talking or listening or whether there is a period in which neither the near end nor the far end is actively talking. In making the decision of which state speakerphone system 20 is in, known systems also pick thresholds which may not be optimal for rooms of all sizes and may also change over time.

Figure 2:
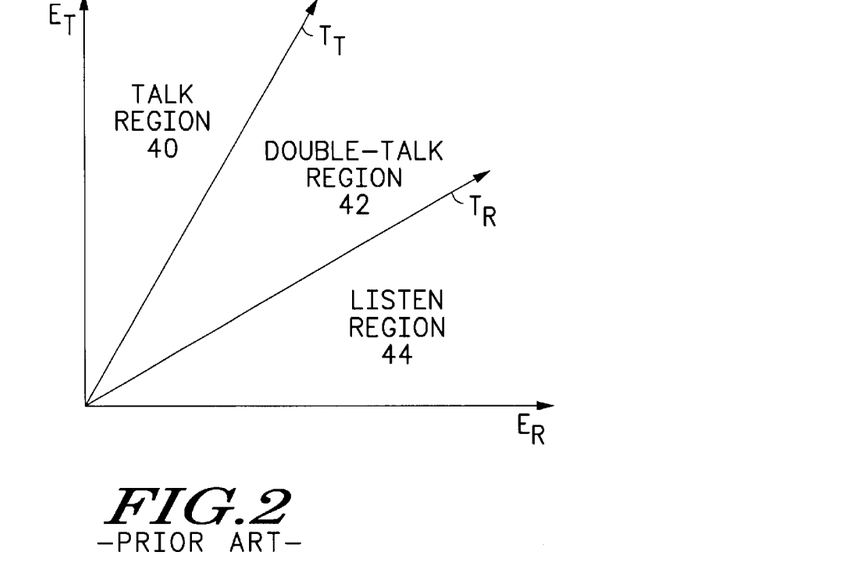
FIG. 2 illustrates a graph depicting the relative transmit and receive energies of the speakerphone system of FIG. 1.

This characteristic is better described with reference to FIG. 2, which illustrates a graph depicting the relative transmit and receive energies. In FIG. 2 the horizontal axis represents the energy level provided to loudspeaker 24 ($E_R$) and the vertical axis represents the energy in the signal from microphone 22 provided to hybrid 36 ($E_T$). Thus a point along the horizontal axis represents the condition in the system in which all the energy is contained in the received signal. Thus the region adjacent to this axis is labeled "LISTEN REGION" 44. Likewise the vertical axis represents those conditions of speakerphone system 20 in which all the energy is due to the input of microphone 22. Thus adjacent to the vertical axis is a region labeled "TALK REGION" 40. LISTEN REGION 44 and TALK REGION 40 furthermore represent all those regions of signal energy which are predominately due to the far end or the near end, respectively. The boundaries of these regions are represented by a first line labeled "$T_T$" which is a threshold of TALK REGION 40 and a second line labeled "$T_R$" which is a threshold of LISTEN REGION 44. Between TALK REGION 40 and LISTEN REGION 44 and bounded by lines $T_T$ and $T_R$ is a region labeled "DOUBLE-TALK REGION" 42. DOUBLE-TALK REGION 42 represents those regions of signal energy in which neither the near-end nor the far-end speaker's energy predominates.

Boundary lines $T_T$ and $T_R$ are defined by a predetermined slope. In known embodiments, these slopes are hard coded and chosen to be optimal across many different configurations in which the speakerphone may be used. However these fixed thresholds create problems in some situations. For example, when the near-end speaker is speaking but at a low signal level due to a low sensitivity of the microphone (i.e. near the origin of FIG. 2), there is some chance that the energy point may be outside of TALK REGION 40 and the speakerphone may incorrectly conclude that the near-end speaker is not talking. Likewise if the far-end speaker is speaking at a low signal level due to a low sensitivity of the microphone, the energy point may be outside of LISTEN REGION 44 and the speakerphone may incorrectly conclude that the far-end speaker is not speaking. What is needed then is a better technique of making the talk, listen, double-talk decisions that takes into account varying system gain conditions.

Figure 3:
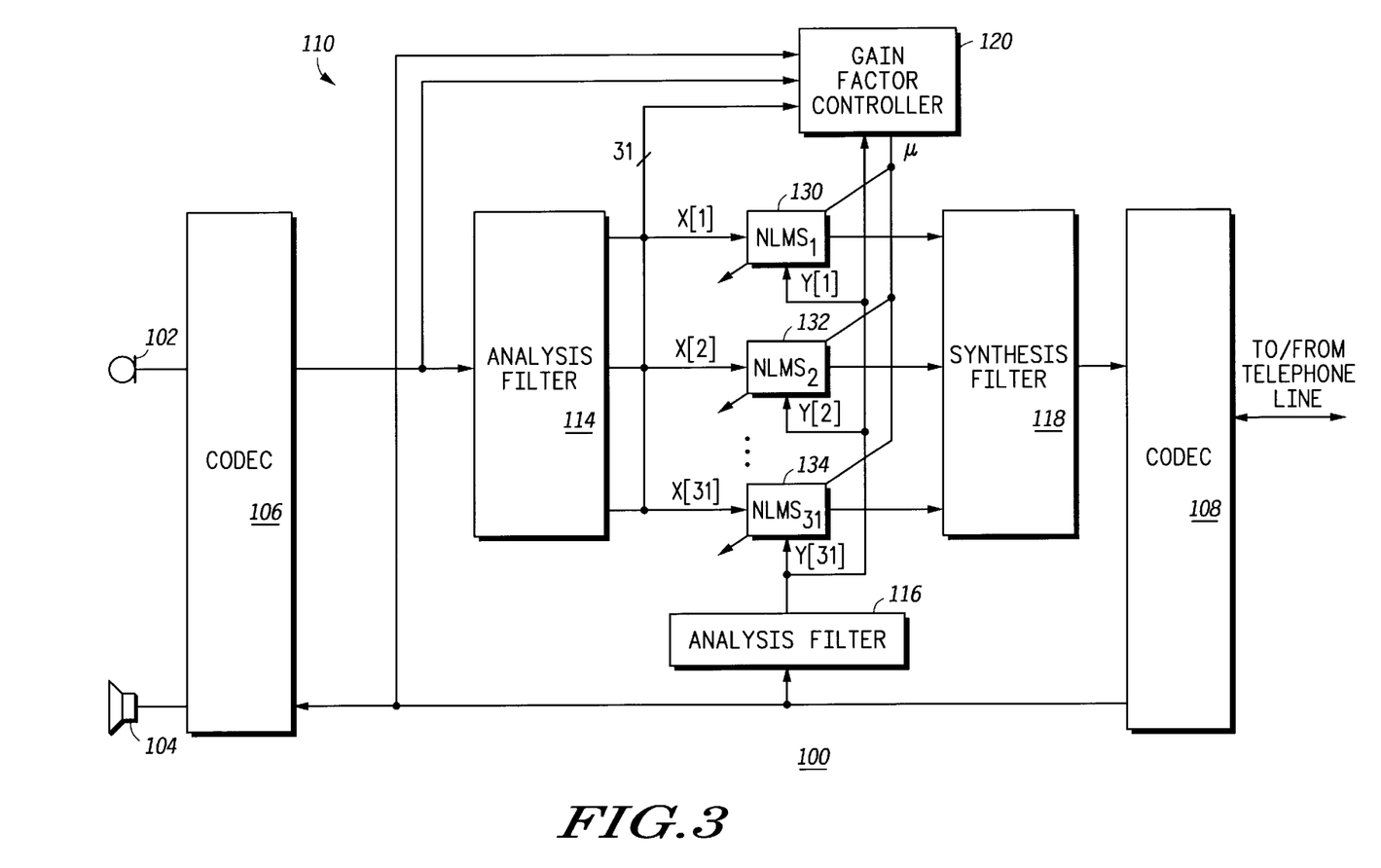
FIG. 3 illustrates a block diagram of a full-duplex communication system using an echo canceller according to the present invention.

FIG. 3 illustrates a block diagram of a full-duplex communication system 100 using an echo canceller 110 according to the present invention. System 100 includes generally a microphone 102, a loudspeaker 104, a coder-decoder (codec) 106, a codec 108, and echo canceller 110. Codec 106 includes an analog-to-digital converter (ADC) which receives an analog input from microphone 102, and provides a transmit signal in the form of a digital data stream corresponding to the analog input. Codec 106 also includes a digital-to-analog converter (DAC) which receives a received signal in the form of a digital data stream and provides an analog output signal corresponding to the digital received signal to loudspeaker 104. Codec 108 includes a DAC which receives an echo cancelled transmit signal and provides an analog output to the telephone line in response thereto, and an ADC which receives an analog signal from the telephone line and provides the digital received signal in response thereto. Echo canceller 110 has a signal input for receiving output of the ADC of codec 106, a reference input for receiving the digital received signal, and an output for providing the echo cancelled transmit signal.

Echo canceller 110 includes an analysis filter 114, an analysis filter 116, a synthesis filter 118, a gain factor controller 120, and a set of thirty-one sub-band adapters of which representative adapters 130, 132, and 134 are illustrated in FIG. 3. Analysis filter 114 has an input for receiving the digital transmit signal (also referred to as the sampled input signal), and thirty-one outputs for providing sub-band signals respectively labeled "X[1]" through "X[31]". Analysis filter 116 has an input for receiving the received signal, and an output for providing thirty-one reference values respectively labeled "Y[1]" through "Y[31]". Synthesis filter 118 has thirty-one inputs for receiving corresponding ones of a set of thirty-one adapted sub-band signals, and an output for providing the echo cancelled transmit signal (also referred to as the echo cancelled output signal). Gain factor controller 120 has a first input for receiving the digital transmit signal, a second input for receiving the digital received signal, a third input for receiving each of the thirty-one sub-band signals X[k], a fourth input for receiving each of the thirty-one reference values Y[k], and an output for providing a gain factor labeled "$\mu$".

In general each sub-band adapter is labeled "NMLS$_k$" and has a first input for receiving a corresponding sub-band input signal X[k], a reference input for receiving a corresponding reference signal Y[k], a gain factor input for receiving gain factor A, and an output for providing a corresponding modified sub-band signal. For example, a first adapter labeled "NLMS1" has an input for receiving sub-band input signal X[1], a reference input for receiving reference value Y[1], a gain factor input for receiving the value $\mu$, and an output for providing a first one of the thirty-one modified sub-band signals.

In operation, analysis filter 114 separates the sampled input signal into thirty-one sub-bands each having a frequency range of the same size. Analysis filter 114 creates the sub-band signals by shifting particular frequency ranges of the time domain signal down to baseband. Likewise, analysis filter 116 creates the sub-band reference signals by shifting the particular frequency ranges of the time-domain received signal down to baseband. Each sub-band adapter performs a digital finite impulse response (FIR) filter on its corresponding sub-band signal to provide the modified sub-band signal. The FIR filter coefficients are determined using a normalized least-mean-squares (LMS) algorithm. Each sub-band adapter uses gain factor $\mu$ as a convergence factor in updating its coefficients using normalized LMS.

Echo canceller 110 is an acoustic echo canceller that cancels reflections of the far end speaker's voice caused by room acoustics. Echo canceller 110 provides a high performance echo canceller without requiring excessive computation time by performing the coefficient update based in part on time-domain signals and in part on sub-band signals. In the illustrated embodiment system 100 is a video teleconference system connected to a telephone line. Echo canceller 110 is particularly well suited for such a system because DSP bandwidth is needed for other computation-intensive functions such as audio and video encoding and decoding. System 100 performs these functions on the echo cancelled transmit signal and the received signal but they are not specifically illustrated in FIG. 3.

Gain factor controller 120 provides gain factor $\mu$ at a value determined by whether system 100 is in one of four states: talk, double-talk, listen, and silence. Gain factor controller 120 first determines if system 100 is in the silence state. The silence state determination is made in the time domain by determining whether both the energy of the sampled input signal and the energy of the received signal are less than respective thresholds. If gain factor controller 120 detects silence, it bypasses the talk, double talk, and listen state determination, saving many valuable processing cycles. If gain factor controller 120 does not detect silence then it proceeds to make the talk, double talk, and listen state determination using sub-band domain signals X[k].

In another embodiment, gain factor controller 120 makes the state determination differently for each sub-band. Thus instead of providing a single gain factor $\mu$, gain factor controller would provide a set of gain factors $\mu[k]$ where each sub-band would receive a corresponding gain factor. This modified echo canceller would have higher performance but require more processing cycles.

Figure 4:
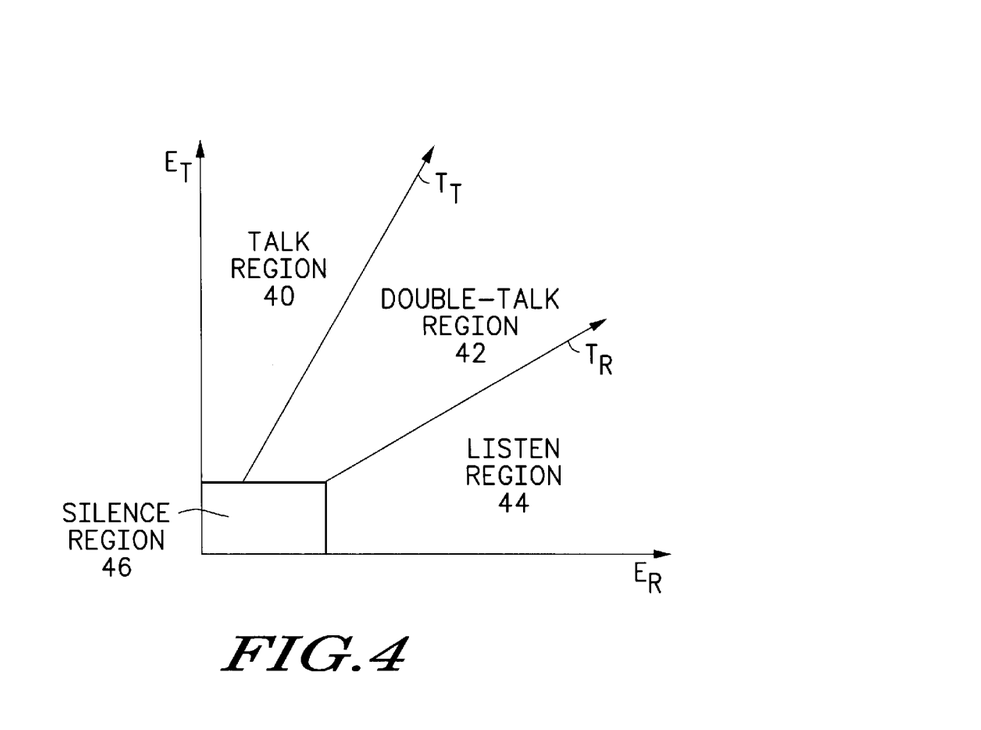
FIG. 4 illustrates a graph depicting the relative transmit and receive energies of the system of FIG. 3.

Silence detection is better understood with reference to FIG. 4, which illustrates a graph depicting the relative transmit and receive energies of system 100 of FIG. 3. FIG. 4 is similar to FIG. 2, except for the presence of a silence region 46. Silence region 46 appears near the origin of the graph, and represents the presence of low signal energy on both the transmit signal and the receive signal. Note that the transmit threshold need not be equal to the receive threshold.

In order to determine that system 100 is in silence region 46, gain factor controller 120 must detect a low energy level on both the transmit and receive signals. The preferred detection technique is better understood with reference to FIG. 5, which illustrates a flow diagram 200 associated with the detection of silence on the transmit, or microphone, signal by gain factor controller 120 of FIG. 3. This flow diagram can also be described by source code written for the DSP56300 family of digital signal processors available from Motorola, Inc., which is listed in Appendix A. Note that the routine is actually performed over sixteen samples (n=0 to 15) of the transmit signal.

Figure 5:
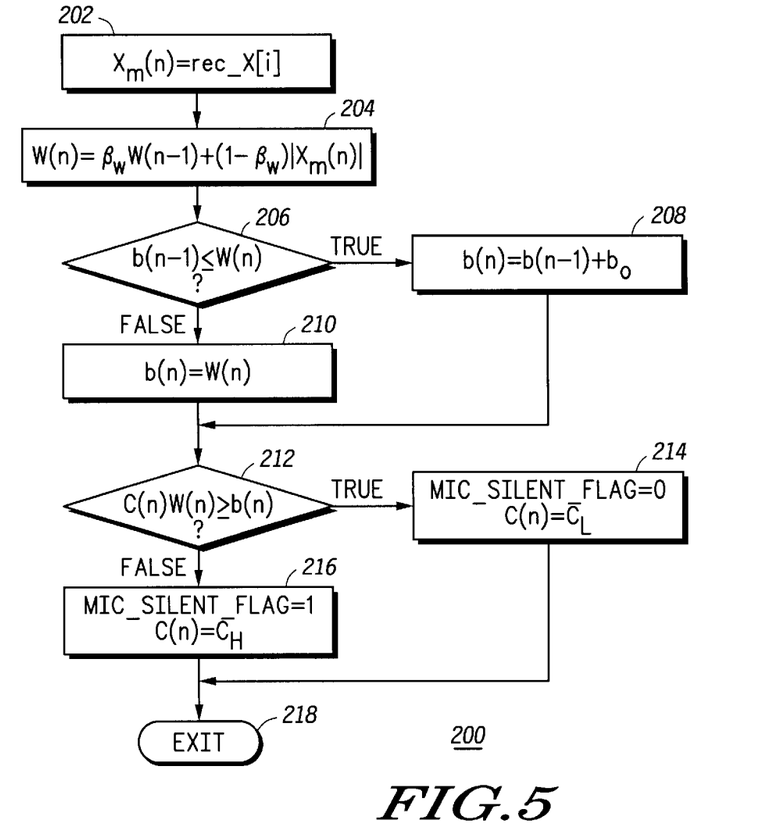
FIG. 5 illustrates a flow diagram associated with the detection of one type of silence by the gain factor controller of FIG. 3.

Since this state detection is performed in the time domain, the relevant variable labeled "$x_M(n)$" is set to equal the received sample labeled "rec_X(i)" at step 202. Next at step 204 the short term average of the received signal at time point n, labeled "w(n)" is estimated by using a fraction $\beta W$ of the prior value w(n−1) and the complementary fraction $(1-\beta_w)$ of the current input $x_M(n)$. The prior value of a long-term average labeled "b", or b(n−1), is next evaluated at step 206. If b(n−1) is less than or equal to w(n), then the next value of b(n) is calculated using the prior value b(n−1) plus an offset value $b_0$ at step 208. If not, then the next value b(n) is set to w(n) at step 210.

Silence is detected when the ratio of b(n)/w(n) falls below a threshold value labeled "c(n)". This expression is preferably evaluated by comparing the product of w(n) and c(n) to b(n) at step 212. If the product c(n)w(n) is greater than or equal to b(n), then a variable labeled "mic_silent_flag" is set to zero and the value of c(n) is updated to a low threshold labeled "$C_L$" at step 214 and the routine is exited at step 218. If the product c(n)w(n) is not greater than or equal to b(n), then the variable mic_silent_flag is set to one and the value of c(n) is updated to a high threshold labeled "$C_H$" at step 216 and the routine is exited at step 218. Note that c(n) assumes one of two fixed values, either $C_L$ or $C_H$, to produce a hysterisis for reducing rapid transitions between the silence and the non-silence states for cases where the ratio b(n)/w(n) remains close to c(n).

This technique is then repeated for the received (loudspeaker) signal. The flow is as described in FIG. 5 except for the use of the digital received signal, and the corresponding source code written for the DSP56300 family of digital signal processors available from Motorola, Inc. is listed in Appendix B. As in Appendix A, sixteen iterations of the flow illustrated in FIG. 5 are performed.

Figure 6:
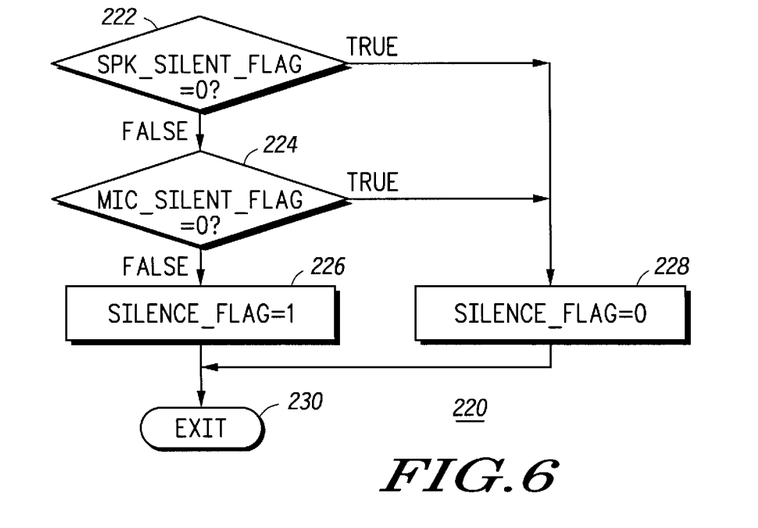
FIG. 6 illustrates a flow diagram of overall silence state detection.

Once the routines are executed for both the microphone signal and the loudspeaker signal, gain factor controller 120 can perform overall silence state detection. FIG.6 illustrates a flow diagram 220 associated with overall silence state detection. First the value of a boolean variable labeled "spk_silent_flag" is evaluated at step 222. If this variable is equal to zero then the boolean variable silence_flag is set to 0 at step 228 and the routine is exited at step 230. If not, then the variable mic_silent_flag is evaluated at step 224. If this variable is equal to 0 then the boolean variable silence_flag is set to 0 at step 228 and the routine is exited at step 230. If not, then the boolean variable silence_flag is set to 1 at step 226, and the routine is exited at step 230. FIG. 6 shows that silence_flag is just a logical AND of mic_silent_flag and spk_silent_flag.

Figure 7:
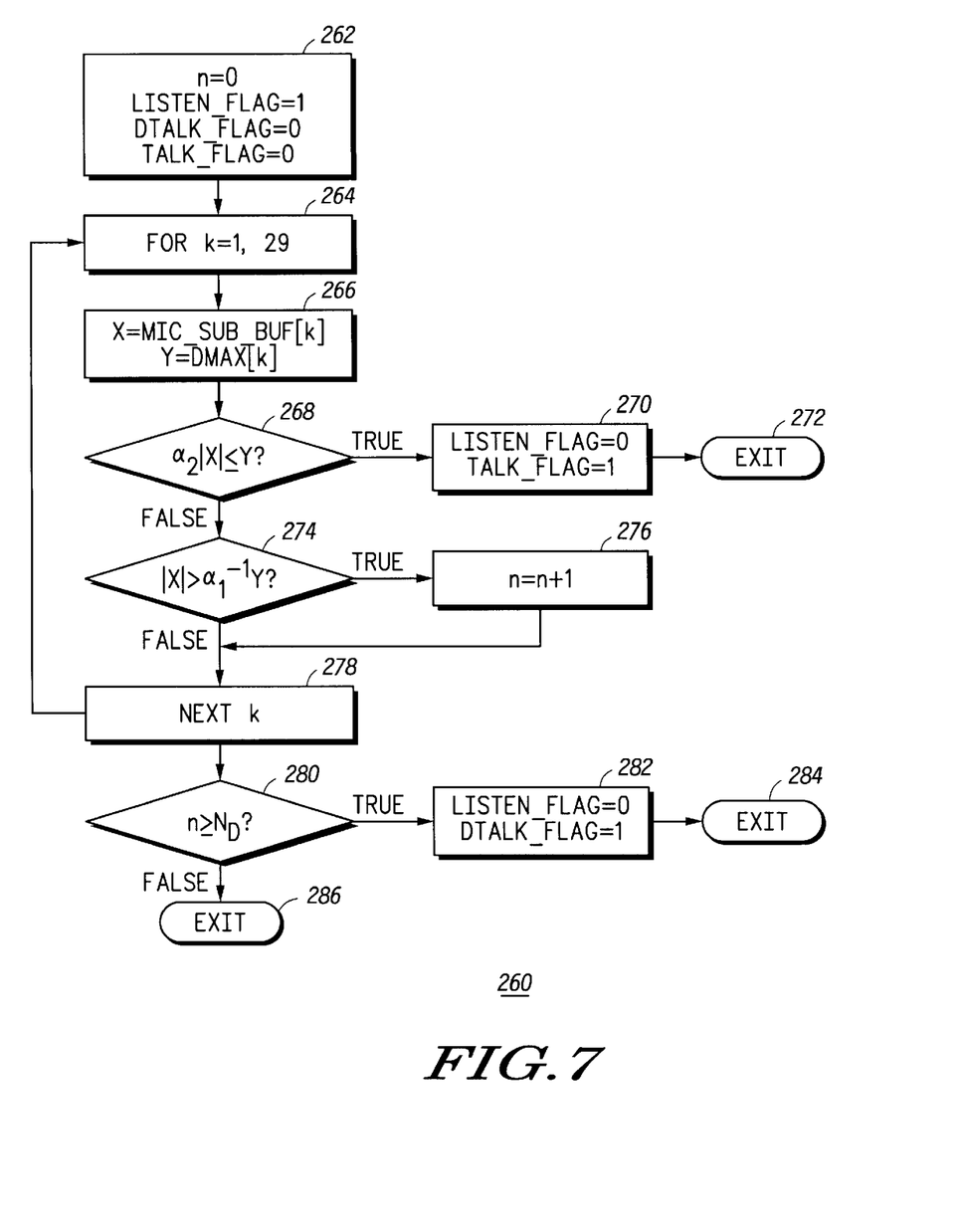
FIG. 7 illustrates a flow diagram associated with the talk, listen, and double-talk state decision.

If silence_flag is set to 0, then gain factor controller 120 proceeds to determine if system 100 is in the talk, listen, or double talk states by examining signals in the sub-band domain. However, if silence_flag is not set to 0 (i.e. set to 1) then the sub-band signals need not be examined since the state of system 100 has already been determined to be the silent state. FIG. 7 illustrates a flow diagram 260 associated with the talk, listen, and double-talk state determinations. This flow diagram can also be described by source code written for the DSP56300 family of digital signal processors available from Motorola, Inc., which is listed in Appendix C. At step 262 all variables are initialized, including a variable labeled "n" which represents the number of occurrences of a sub-band signal indicating that system 100 is in the double-talk state. Variable listen_flag is initialized to 1, and dtalk_flag and talk_flag are initialized to 0.

The sequence of steps 266, 268, 270, 274, and 276 is performed for each sub-band filter unless the talk state is detected. The sequence is entered at step 264 in which the sub-band identifier k is set to 1, and is updated at step 278 until k=29. Note that in the actual embodiment only 29 of 31 filters are used.

At step 266 the value of signal x is determined by reading the instantaneous value of the microphone input and taking the absolute value thereof. The value of the digital received signal y is determined as the decaying maximum value of the received signal, dmax[k]. For example, if y[k]<dmax[k], then dmax[k+1]=0.995*dmax[k]. If y[k]≧dmax[k], then dmax[k+1]=y[k]. The decaying maximum value allows the decision to take into account fast attacks and slow releases in speech activity.

The talk determination is made by comparing the quantity $\alpha_2|x|$ with y at step 268 (where $\alpha_2$ is similar to $T_T$ in FIG. 4). The value of $\alpha_2$ determines the slope of the line separating the talk and double-talk regions. If the quantity $\alpha_2 x$ is less than or equal to y, then listen_flag is set to 0 and talk_flag is set to 1. Then the routine is exited at step 272.

If however $\alpha_2|x|$ is not less than or equal to y, then a further determination is made. The absolute value of x is compared to a second coefficient $\alpha_1^{-1}$ times y at step 274 (where $\alpha_1$ is similar to $T_R$ in FIG. 4). If $|x|$ is greater, then the system is in the double-talk state, the value of n is incremented at step 276, and the loop repeats for another value of k. If $|x|$ is not greater, then the system is in the listen state and the loop repeats for another value of k without updating the value of n.

After the routine processes all values of k, if the loop was not earlier exited at step 272 with the determination that system 100 is in the talk state, then the final value of n is compared with a threshold value labeled "$N_D$" at step 280. If this expression is true, then the system is in the double-talk state, and at step 282 the listen_flag is set to 0 and dtalk_flag is set to 1. Then the routine is exited at step 284. If this expression is not true, then the loop is exited at step 286. Since listen_flag was previously initialized to 1, it remains 1 to indicate the listen state.

Figure 8:
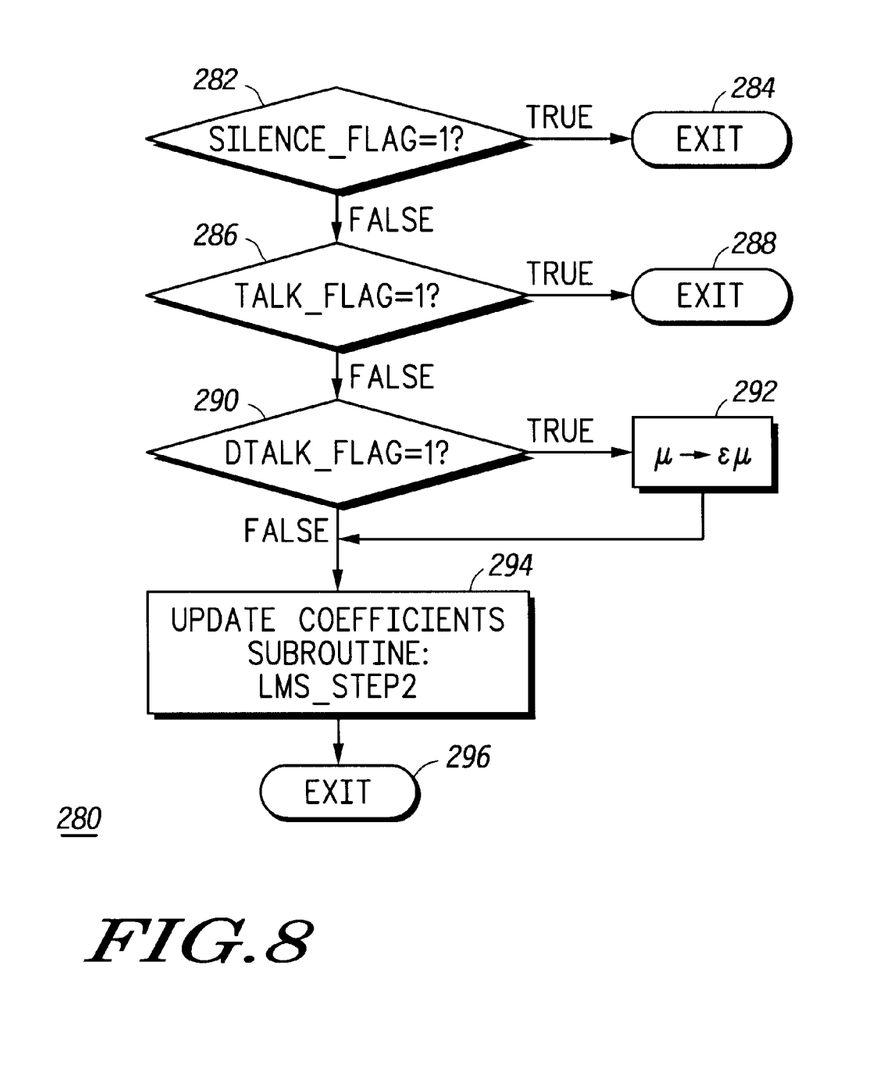
FIG. 8 illustrates a flow diagram associated with the use of the state decisions of FIGS. 6 and 7 in updating the coefficients of the echo canceller of FIG. 3.

The steps that gain factor controller 120 takes based on the state may be better understood with reference to FIG. 8, which illustrates a flow diagram 280 associated with the overall operation of gain factor controller 120. Such a flow is preferably implemented with a subroutine running on a general-purpose DSP. The flow begins with a determination, at step 282, of whether silence_flag is set. If silence_flag has a value of 1, then gain factor controller 120 has detected the silence state, and the subroutine is exited at step 284, without changing gain factor $\mu$ and without performing a coefficient update. If silence_flag has a value of 0, then gain factor controller 120 has not detected the silence state. Gain factor controller 120 next checks a variable labeled "talk_flag" at step 286. If talk flag has a value of 1, then gain factor controller 120 detects that system 100 is in the talk state. If system 100 is in the talk state, then the routine is exited at step 288 without changing the gain factor $\mu$ and without performing a coefficient update. If not in talk state, then gain factor controller 120 determines whether system 100 is in the double-talk state at step 290 by determining whether a variable labeled "dtalk_flag" has a value of 1. If so, then gain factor controller 120 updates gain factor $\mu$ by multiplying it by a value labeled "$\epsilon$" at step 292. If not, gain factor controller 120 does not alter gain factor $\mu$. Then gain factor controller 120 causes the sub-band adapters to perform the coefficient updates using the normalized LMS algorithm at step 294. In either case, the routine is exited at step 296.

Alternate embodiments may perform the silence detection using the echo cancelled transmit signal rather than the digital transmit signal (as was described above). In this case, a procedure similar to that of FIGS. 5 and 6 would be performed after the analysis of FIG. 7. That is, the gain factor controller 120 would determine a possible listen, talk, or double talk state based on the sub-band signals, and then the echo cancelled transmit signal and the digital received signal would be analyzed to determine whether the system is in fact in a silence state.

While the invention has been described in the context of a preferred embodiment, it will be apparent to those skilled in the art that the present invention may be modified in numerous ways and may assume many embodiments other than that specifically set out and described above. For example, the analysis filters, synthesis filter, and normalized LMS blocks can be performed by software running on a general-purpose DSP, by hardware circuitry, or by a combination thereof. In other embodiments the transmission line hybrid which connects the speakerphone to the wireline telephone system may be replaced by a suitable interface to a wireless network. Accordingly, it is intended by the appended claims to cover all modifications of the invention which fall within the true scope of the invention.

---

APPENDIX A

;;;;;;;;;;;;;;;;;;;;;;;;;;;;;;;;;;;;;;;;;;;;;;;;;;;;;;;;;;;;;;;;;;;;;;;;;;;;;
; silence detection using long term and short term integrator.;
;;;;;;;;;;;;;;;;;;;;;;;;;;;;;;;;;;;;;;;;;;;;;;;;;;;;;;;;;;;;;;;;;;;;;;;;;;;;;
_mic_silence_detect
```
        move  #rec_X, r3        ; 16 samples of mic_buf data
        move  y:wn, x1          ; input reg x1 <- wn
```

-continued

```
            do      #16, _mic_sil_detect2      ; integrate on abs(x0) for 16 samples
            move    x: (r3)+, x0
            move    #beta_w, y0                ; input reg y0 <- beta_w
            jsr     Est_Energy2                ; a = beta_w*x1 + (1.0-beta_w)*abs(x0)
            move    a, x1                      ; x1 <- a for next operation
_mic_sil_detect2
            move    a, y:wn                    ; wn <- a
            move    y:bn, x0                   ; x0 <- bn
            cmp     x0, a                      ; a <- wn
            jlt     _mic_integrate_done        ; if(wn < bn) goto _integrate_done
_mic_integrate
            move    #>delta_b0, a              ;
            add     x0, a                      ; bn = bn + b0
_mic_integrate_done
            move    a, y:bn                    ; save bn
            move    y:cn, x0                   ; cn->x0,
            move    y:wn, y0                   ; wn->y0,
            mpy     x0, y0, a       a, x1      ; bn->x1, cn*wn->a
            cmp     x1, a
            jlt     _mic_silence               ; if(cn*wn < bn) goto _mic_silence
            bclr    #mic_silent, x:ecflg       ; else clear silence bit
            move    #cL, x0                    ;
            move    x0, y:cn                   ; cn <- cL
            jmp     _mic_silence_done
_mic_silence
            bset    #mic_silent, x:ecflg       ; set silence bit
            move    #cH, x0                    ;
            move    x0, y:cn                   ; cn <- cH
_mic_silence_done
```

APPENDIX B

```
;;;;;;;;;;;;;;;;;;;;;;;;;;;;;;;;;;;;;;;;;;;;;;;;;;;;;;;
; speaker silence detection in the time domain. ;
;;;;;;;;;;;;;;;;;;;;;;;;;;;;;;;;;;;;;;;;;;;;;;;;;;;;;;;
            btst    #0, x:sil_detect
            bcc     sil_detect_done
_spk_silence_detect
            move    #new_X, r3                 ; 16 samples of mic_buf data
            move    y:spk_wn, x1               ; input reg x1 <- wn
            do      #16, _spk_sil_detect2      ; integrate on abs(x0) for 16 samples
            move    x: (r3)+, x0
            move    #beta_w, y0                ; input reg y0 <- beta_w
            jsr     Est_Energy2                ; a = beta_w*x1 + (1.0-beta_w)*abs(x0)
            move    a, x1                      ; x1 <- a for next operation
_spk_sil_detect2
            move    a, y:spk_wn                ; wn <- a
            move    y:spk_bn, x0               ; x0 <- bn
            cmp     x0, a                      ; a <- wn
            jlt     _spk_integrate_done        ; if(wn < bn) goto _integrate_done
_spk_integrate
            move    #>delta_b0, a              ;
            add     x0, a                      ; bn = bn + b0
_spk_integrate_done
            move    a, y:spk_bn                ; save bn
            move    y:spk_cn, x0               ; cn->x0,
            move    y:spk_wn, y0               ; wn->y0,
            mpy     x0, y0, a       a, x1      ; bn->x1, cn*wn->a
            cmp     x1, a
            jlt     _spk_silence               ; if(cn*wn < bn) goto _mic_silence
            bclr    _spk_silent, x:ecflg       ; else clear silence bit
            move    #cL, x0                    ;
            move    x0, y:spk_cn               ; cn <- cL
            jmp     spk_silence_done
_spk_silence
            bset    #spk_silent, x:ecflg       ; set silence bit
            move    #cH, x0                    ;
            move    x0, y:spk_cn               ; cn <- cH
_spk_silence_done
```

APPENDIX C

```
DOUBLE_TALK_DETECT
            move    #>0, x1
            move    x1, x:dtalk_cnt            ; reset dtalk counter
            bclr    #dtalk, x:ecflg            ; no doubletalk is default
            bset    #listen, x:ecflg
            bclr    #talk, x:ecflg
            move    #mic_sub_buf, r7           ; mic_sub_buf pointer
```

-continued

```
    move   #$ffffff, m7            ; linear
    move   #dmax, r2               ; dmax pointer
    move   m7, m2                  ; linear
    do     #SBLIMIT, _sb54
    move   x:(r2)+, x0   y:(r7)+, a  ; a = mic_sub_buf[sb], x0 = dmax[sb]
    abs    a
    move   x:alfa2, x1   a, y1
    mpy    x1, y1, b
    cmp    x0, b                   ; alfa2*|mic| - dmax >= 0
    jle    _no_talk
    bset   #talk, x:ecflg          ; set flag
    bclr   #listen, x:ecflg        ; clear listen bit
    enddo
    jmp    _done
_no_talk
;check for double talk
    move   x:alfa1_inv, y0
    mpy    x0, y0, b               ; alfa1_inv*dmax
    move   b, x0
    cmp    x0, a                   ; |mic| - alfa1_inv*dmax < 0
    jgt    _double_talk
    jmp    _sb53
_double_talk
    move   #>1, x1
    move   x:dtalk_cnt, a
    add    x1, a
    move   a, x:dtalk_cnt
_sb53
    nop
_sb54
    move   x:dtalk_cnt, x1
    move   x:dtalk_num, a
    cmp    x1, a
    jge    _done
    bset   #dtalk, x:ecflg
    bclr   #listen, x:ecflg
_done
```

We claim:

1. An echo canceller for a full-duplex communication system, comprising:
   a first filter having an input for receiving a sampled input signal, and a plurality of outputs for providing a plurality of sub-band signals;
   a plurality of sub-band adapters wherein each adapter receives a corresponding one of the plurality of sub-band signals and a gain factor, and performs a mathematical calculation based at least in part on the corresponding one of the plurality of sub-band signals and the gain factor to produce a corresponding modified sub-band signal;
   a second filter having a plurality of inputs for receiving the modified sub-band signals and an output for providing an echo cancelled output signal; and
   a gain factor controller having an output for providing the gain factor to the sub-band adapters, said gain factor controller determining a state of the echo canceller based at least in part on the plurality of sub-band signals and a time domain signal and selectively updating the gain factor based upon the state of the echo canceller.

2. The echo canceller of claim 1, wherein the time domain signal is one of the sampled input signal, the echo cancelled output signal, and a receive signal from a transmission device.

3. The echo canceller of claim 2, wherein the gain factor controller receives the one of the sampled input signal, the echo cancelled output signal, and the receive signal;
   provides a first silence detector output; and
   determines whether the echo canceller is in a first state in response to the first silence detector output.

4. The echo canceller of claim 3, wherein the gain factor controller receives another one of the sampled input signal, the echo cancelled output signal, and the receive signal;
   provides a second silence detector output; and
   determines whether the echo canceller is in the first state in response to the first and second silence detector outputs.

5. The echo canceller of claim 1, further comprising a third filter having an input for receiving a receive signal from a transmission device and a plurality of outputs for providing a plurality of reference signals to the plurality of sub-band adapters.

6. The echo canceller of claim 5, wherein each of the plurality of sub-band adapters receives a corresponding one of the plurality of reference signals.

7. The echo canceller of claim 1, wherein each of the plurality of sub-band adapters selectively updates a filter coefficient unit based on the state of the echo canceller.

8. The echo canceller of claim 1, wherein the gain factor controller has a plurality of outputs for providing a corresponding gain factor of a plurality of gain factors to each of the plurality of sub-band adapters.

9. The echo canceller of claim 8, wherein the gain factor controller selectively updates the plurality of gain factors based upon a determination of a plurality of states wherein each of the sub-band adapters has a corresponding state.

10. The echo canceller of claim 9, wherein each of the plurality of states is one of talk, listen, double talk, and silence.

11. The echo canceller of claim 1, wherein the state of the echo canceller is one of talk, listen, double talk, and silence.

12. The echo canceller of claim 11, wherein the gain factor controller updates the gain factor if the state of the echo canceller is double talk.

13. A method for reducing echo in a full-duplex communication system, comprising:

receiving a sampled input signal;

converting said sampled input signal into a plurality of sub-band signals;

determining a state of the full-duplex communication system based at least in part on the plurality of sub-band signals and a time domain signal;

selectively updating a gain factor based at least in part on the state of the full-duplex communication system;

modifying said plurality of sub-band signals based at least in part on the gain factor to produce a plurality of modified sub-band signals; and combining said plurality of modified sub-band signals to produce an echo cancelled output signal corresponding to the sampled input signal.

14. The method of claim 13, wherein determining the state of the full-duplex communication system comprises determining whether the full-duplex communication system is in one of a talk state, a double talk state, a listen state, and a silence state.

15. The method of claim 14, wherein the determination of whether the full-duplex communication system is in the silence state is based in part on the time domain signal, wherein the time domain signal is one of the sampled input signal, the echo cancelled output signal, and a receive signal from a transmission device.

16. The method of claim 15, wherein the determination of whether the full-duplex communication system is in the silence state is further based in part on another one of the sampled input signal, the echo cancelled output signal, and the receive signal.

17. The method of claim 14, wherein the determination of whether the full-duplex communication system is in one of the talk state, the double talk state, and the listen state is based in part on the plurality of sub-band signals.

18. The method of claim 14, wherein the gain factor is updated if the full-duplex communication system is in the double talk state.

19. The method of claim 14, wherein modifying said plurality of sub-band signals is further based on a corresponding reference signal of a plurality of reference signals.

20. The method of claim 19, wherein each of the plurality of sub-band signals includes at least one corresponding coefficient and wherein modifying the plurality of sub-band signals further comprises selectively updating the at least one of the corresponding coefficients.

21. The method of claim 20, wherein selectively updating the at least one of the corresponding coefficients further comprises:

updating the at least one corresponding coefficient if the full-duplex communication system is one of the listen state and the double talk state; and not updating the at least one corresponding coefficient if the full-duplex communication system is in one of the talk state and the silence state.

22. The method of claim 13, wherein modifying said plurality of sub-band signals is further based on a corresponding reference signal of a plurality of reference signals.

23. The method of claim 13, wherein determining the state of the full-duplex communication system comprises determining a corresponding sub-band state for each sub-band signal.

24. The method of claim 23, wherein each corresponding sub-band state is one of a talk state, a double talk state, a listen state, and a silence state.

25. The method of claim 23, wherein selectively updating the gain factor comprises selectively updating a corresponding sub-band gain factor for each sub-band signal based at least in part on the corresponding sub-band state of the sub-band signal.

* * * * *